(12) United States Patent
Tzeng et al.

(10) Patent No.: US 6,972,548 B2
(45) Date of Patent: Dec. 6, 2005

(54) PULSE FREQUENCY MODULATED VOLTAGE REGULATOR CAPABLE OF PROLONGING A MINIMUM OFF-TIME

(75) Inventors: Guang-Nan Tzeng, Hsin-Chu (TW); Yung-Chih Chen, Ping-Tung (TW); Rong-Chin Lee, Ping-Tung (TW)

(73) Assignee: Aimtron Technology Corp., Hsinchu (TW)

( * ) Notice: Subject to any disclaimer, the term of this patent is extended or adjusted under 35 U.S.C. 154(b) by 206 days.

(21) Appl. No.: 10/707,165

(22) Filed: Nov. 25, 2003

(65) Prior Publication Data

US 2005/0111244 A1 May 26, 2005

(51) Int. Cl.⁷ .............................................. G05F 1/40
(52) U.S. Cl. ..................................................... 323/282
(58) Field of Search ............................... 323/268, 271, 323/282, 284, 285; 363/41, 50, 56.01, 56.12

(56) References Cited

U.S. PATENT DOCUMENTS

| | | | |
|---|---|---|---|
| 5,568,044 A | 10/1996 | Bittner | |
| 5,748,422 A * | 5/1998 | Heaston et al. | 361/18 |
| 5,801,518 A | 9/1998 | Ozaki et al. | |
| 6,313,616 B1 * | 11/2001 | Deller et al. | 323/282 |
| 6,388,433 B2 * | 5/2002 | Marty | 323/284 |
| 6,545,882 B2 | 4/2003 | Yang | |
| 6,801,024 B2 * | 10/2004 | Bernardon | 323/224 |

OTHER PUBLICATIONS

Maxim Integrated Products Data Sheet No. 19-0113 Rev. Jan. 2, 1995, pp. 1-8.

* cited by examiner

*Primary Examiner*—Matthew V. Nguyen
(74) *Attorney, Agent, or Firm*—Winston Hsu

(57) ABSTRACT

In a pulse frequency modulated (PFM) voltage regulator, a PFM switching controller is provided to generate a PFM switching signal for converting a DC voltage source to an output voltage. A minimum OFF-time controller provides the PFM switching signal with a minimum OFF-time. In response to the output voltage, a feedback circuit generates a feedback signal. When the output voltage is lower than a predetermined target voltage, an OFF-time prolonging circuit prolongs the minimum OFF-time in response to the feedback signal. In other words, a time of delivering energy to a capacitor from an inductor may be prolonged by the OFF-time prolonging circuit. Therefore, a ripple of the output voltage is effectively reduced when the PFM voltage regulator is operated in a heavy loading condition.

20 Claims, 5 Drawing Sheets

PULSE FREQUENCY MODULATED VOLTAGE REGULATOR CAPABLE OF PROLONGING A MINIMUM OFF-TIME

BACKGROUND OF INVENTION

1. Field of the Invention

The present invention relates to a pulse frequency modulated (PFM) voltage regulator and, more particularly, to a PFM voltage regulator capable of prolonging a minimum OFF-time, thereby reducing a ripple of an output voltage in a heavy loading condition.

2. Description of the Related Art

Typically, a voltage regulator is used for supplying an output voltage with a regulated voltage level from a DC voltage source by appropriately controlling a duty cycle of a power switch transistor. Depending on requirements of practical applications, the regulated output voltage may be higher or lower than the original DC voltage source. Of methods for controlling the duty cycle of the power switch transistor in the voltage regulator, the most frequently used are a PFM switching control mode and a pulse width modulated (PWM) switching control mode. The PFM voltage regulator turns on the power switch transistor each time when the output voltage decreases to become equal to a target voltage, thereby regulating the output voltage. On the other hand, the PWM voltage regulator controls the on and off states of the power switch transistor by a rectangular wave having a predetermined duty cycle, thereby achieving the effect of regulating the output voltage.

Neither the PFM voltage regulator nor the PWM voltage regulator can provide the same satisfactory performance when operated both in a light loading condition and in a heavy loading condition. More specifically, the PFM voltage regulator in the heavy loading condition suffers from a great ripple of the output voltage. On the other hand, the PWM voltage regulator has a drawback of becoming a low efficiency regulator in the light loading condition since the power consumption caused by the switching of the power switch transistor becomes relatively large with respect to the output power supplied.

Both of U.S. Pat. No. 5,568,044 and U.S. Pat. No. 6,545,882 have disclosed a PWM voltage regulator characterized in that an original PWM control mode is changed to a PFM control mode in a light loading condition by detecting an inductor current in order to improve the efficiency of the light loading PWM voltage regulator. However, the prior art voltage regulator is required to employ a complicated PWM and PFM dual mode switching circuit.

Alternatively, U.S. Pat. No. 5,801,518 has disclosed a PFM voltage regulator characterized in that an ON-time of the power switch transistor is prolonged and/or an OFF-time of the power switch transistor is shortened in accordance with a degree of decrease for an output voltage. The prior art considers that a longer ON-time may cause more energy to be stored in an inductor and a shorter OFF-time may prevent a capacitor from discharging too much, so the PFM voltage regulator may have an improved output ripple in the heavy loading condition. Contrary to the assumptive consideration, the prior art voltage regulator in practice provides an even larger output ripple. With reference to a paragraph of lines 31 to 35, column 8 in the specification of U.S. Pat. No. 5,801,518, it is assumed that the output voltage of the PFM voltage regulator rises to the maximum possible peak value immediately after the energy stored in the inductor is delivered to the capacitor, i.e. at the instant when the power switch transistor is turned off, and then decreases along with time. As a matter of fact, this assumption cannot be established for a heaving loading PFM voltage regulator, which will be described in more detail later. This is the reason why U.S. Pat. No. 5,801,518 failed to improve the ripple.

FIG. 1(a) is a circuit block diagram showing a conventional PFM voltage regulator 10. Referring to FIG. 1(a), when a power switch transistor Q, such as an NMOS transistor, is at the ON state, a potential at a node A is lower than a potential at an output terminal B, i.e. an output voltage $V_{out}$, such that a diode D is unconductive. Therefore, an inductor L stores energy supplied from a DC voltage source $V_{in}$, resulting in a linear increase of an inductor current $I_L$. Meanwhile, a capacitor C is discharged to supply a load current $I_{load}$, resulting in a decrease of the output voltage $V_{out}$ at the output terminal B. When the power switch transistor Q is at an OFF state, the energy stored in the inductor L is delivered to the capacitor C through the conductive diode D, thereby raising the output voltage $V_{out}$ at the output terminal B.

More specifically, a PFM switching controller 11 generates a PFM switching signal 12 for controlling the ON and OFF states of the power switch transistor Q through a driver 13. The PFM switching signal 12 is a pulse signal, each pulse of which may make the power switch transistor Q conductive, for example. In this case, an internal between two consecutive pulses is representative of a period during which the power switch transistor Q is unconductive. The pulse width of the PFM switching signal 12 is in principle a fixed value, which is determined by a constant ON-time controller 14. However, when an over current protection circuit 15 detects that the inductor current $I_L$ is higher than a predetermined upper limit of current, the over current protection circuit 15 causes the PFM switching controller 11 to shorten the pulse width of the PFM switching signal 12. On the other hand, the interval between two consecutive pulses of the PFM switching signal 12 is determined by a feedback circuit 16. When the feedback circuit 16 detects that the output voltage $V_{out}$ at the output terminal B is lower than the target voltage due to the discharge of the capacitor, the feedback circuit 16 causes the PFM switching controller 11 to output a pulse for conducting the power switch transistor Q again. However, the interval between two consecutive pulses are prevented from being shorter than a minimum OFF-time determined by a minimum OFF-time controller 17.

FIG. 1(b) is a waveform timing chart showing an operation of the conventional heavy loading PFM voltage regulator 10 shown in FIG. 1(a). During a period P1, when the output voltage $V_{out}$ decreases to become lower than the target voltage $V_o$, i.e. a DC component of the output voltage $V_{out}$, the PFM switching signal 12 enters a high level state H with a constant pulse width (or ON-time) $T_{ON,\ con}$, resulting in the linear increase of the inductor current $I_L$ for storing energy in the inductor L. As clearly seen from FIG. 1(b), the output voltage $V_{out}$ in a heavy loading condition exhibits a considerably large degree of decrease during the constant ON-time $T_{ON,\ con}$. After the constant ON-time $T_{ON,\ con}$, the PFM switching signal 12 enters a low level state L such that the energy stored in the inductor L is delivered to the capacitor C, thereby raising the output voltage $V_{out}$. However, the output voltage $V_{out}$ is still lower than the target voltage $V_o$ even after the capacitor C is charged for a minimum OFF-time $T_{OFF,\ min}$ because in the heavy loading condition a component of the inductor current $I_L$ applicable for charging the capacitor C becomes relatively smaller. At this moment, the PFM switching controller 11 causes the PFM switching signal 12 to enter again the high level state H with the constant ON-time $T_{ON, con}$. As clearly seen from FIG. 1(b), during the minimum OFF-time $T_{OFF, min}$, the energy stored in the inductor L fails to be completely delivered to the capacitor C, which is contrary to the assumption of U.S. Pat. No. 5,801,518, since the inductor current $I_L$ does not decrease to zero, resulting in the impossibility of reaching the maximum possible peak value for the output voltage $V_{out}$. In this case, during periods P2 and P3 the inductor current $I_L$ due to continuous accumulation eventually reaches the upper limit of current $I_{max}$, resulting in the shortening of the constant ON-time $T_{ON, con}$ of the PFM switching signal ON, con 12.

When the power switch transistor Q after switching between on and off many times is turned off again during the period P3, the output voltage $V_{out}$ finally raises over the target voltage $V_o$. As a result, the energy continuously stored in the inductor L is completely delivered at a time to the capacitor C, causing a very great output ripple. It takes a significantly long OFF-time for the output voltage $V_{out}$ to decrease back to the target voltage $V_o$ from the maximum value $V_{high}$. Thereafter, the PFM switching signal 12 enters the high level state H with the constant ON-time $T_{ON, con}$ for turning on the power switch transistor Q to repeat the operations described above. As clearly seen from FIG. 1(b), the output voltage $V_{out}$ generated from the conventional PFM voltage regulator 10 has a very great ripple 19 in the heavy loading condition.

Since the delivery of the energy between the inductor L and the capacitor C fails to achieve a good efficiency as described above, the conventional PFM voltage regulator 10 inevitably spends an disadvantageously longer time on a transient period from start-up to a stable operational state where the output voltage $V_{out}$ reaches the target voltage $V_o$.

SUMMARY OF INVENTION

In view of the above-mentioned problems, an object of the present invention is to provide a PFM voltage regulator capable of prolonging a minimum OFF-time, thereby reducing a ripple of an output voltage in a heavy loading condition.

Another object of the present invention is to provide a PFM voltage regulator capable of prolonging a minimum OFF-time, thereby becoming operable not only in a light loading condition but also in a heavy loading condition.

Still another object of the present invention is to provide a PFM voltage regulator capable of prolonging a minimum OFF-time, thereby shortening a transient period from start-up to a stable operational state.

In a PFM voltage regulator, a PFM switching controller is provided to generate a PFM switching signal for converting a DC voltage source to an output voltage. A minimum OFF-time controller provides the PFM switching signal with a minimum OFF-time. In response to the output voltage, a feedback circuit generates a feedback signal. When the output voltage is lower than a predetermined target voltage, an OFF-time prolonging circuit prolongs the minimum OFF-time in response to the feedback signal. Therefore, a ripple of the output voltage is effectively reduced when the PFM voltage regulator is operated in a heavy loading condition.

Preferably, the minimum OFF-time of the PFM switching signal is prolonged along with an increase of an absolute difference between the output voltage and the predetermined target voltage.

Preferably, the minimum OFF-time controller includes a capacitor and a minimum OFF-time setting current source for charging the capacitor. The predetermined minimum OFF-time is determined by a charging period necessary for raising a potential difference across the capacitor from zero to a predetermined reference voltage.

Preferably, the OFF-time prolonging circuit includes: a prolonging reference voltage set lower than a target feedback signal, in which the feedback signal is generated by the feedback circuit when the output voltage is equal to the predetermined target voltage, and a differential current pair for determining a sinking current in accordance with an absolute difference between the feedback signal and the prolonging reference voltage. The sinking current is used for prolonging the predetermined minimum OFF-time when the feedback signal is lower than the prolonging reference voltage.

According to another aspect of the present invention, the PFM voltage regulator includes an inductive means and a capacitive means. The inductive means is coupled to a DC voltage source. The capacitive means has a terminal which is coupled to the inductive means and provides an output voltage. A PFM switching controller generates a PFM switching signal for converting the DC voltage source to the output voltage. In response to the output voltage, a feedback circuit generates a feedback signal. A minimum time controller is coupled to the PFM switching controller for controlling a minimum time of each period of the PFM switching signal spent on delivering energy from the inductive means to the capacitive means. When the output voltage is lower than a predetermined target voltage, a time prolonging circuit prolongs the minimum timespent on delivering energy from the inductive means to the capacitive means in response to the feedback signal.

Preferably, the minimum time spent on delivering energy from the inductive means to the capacitive means is prolonged along with an increase of the absolute difference between the output voltage and the predetermined target voltage.

According to still another aspect of the present invention, an OFF-time prolonging circuit is provided for a PFM voltage regulator. The PFM voltage regulator converts a DC voltage source to an output voltage by using a PFM switching signal having a predetermined minimum OFF-time. The output voltage has a DC component equal to a predetermined target voltage. A feedback signal is indicative of the output voltage. When the output voltage is equal to the predetermined target voltage, the feedback signal is referred to as a target feedback signal. A first reference voltage is set lower than the target feedback signal. A first differential current pair determines a first sinking current in accordance with an absolute difference between the feedback signal and the first reference voltage. The first sinking current is used for prolonging the predetermined minimum OFF-time when the feedback signal is lower than the first reference voltage.

Preferably, the lower the feedback signal is than the first reference voltage, the larger the first sinking current is.

Preferably, the OFF-time prolonging circuit further comprises: a second reference voltage set lower than the first reference voltage, and a second differential current pair for determining a second sinking current in accordance with an absolute difference between the feedback signal and the second reference voltage. The first and second sinking currents are used for prolonging the predetermined minimum OFF-time when the feedback signal is lower than the second reference voltage.

Preferably, the predetermined minimum OFF-time is set as a period necessary for raising a potential difference across a capacitor from zero to a predetermined voltage by using a charging current. Preferably, the first sinking current is used for reducing the charging current.

BRIEF DESCRIPTION OF DRAWINGS

The above-mentioned and other objects, features, and advantages of the present invention will become apparent with reference to the following descriptions and accompanying drawings, wherein.

DETAILED DESCRIPTION

The preferred embodiments according to the present invention will be described in detail with reference to the drawings.

Figure 1A:
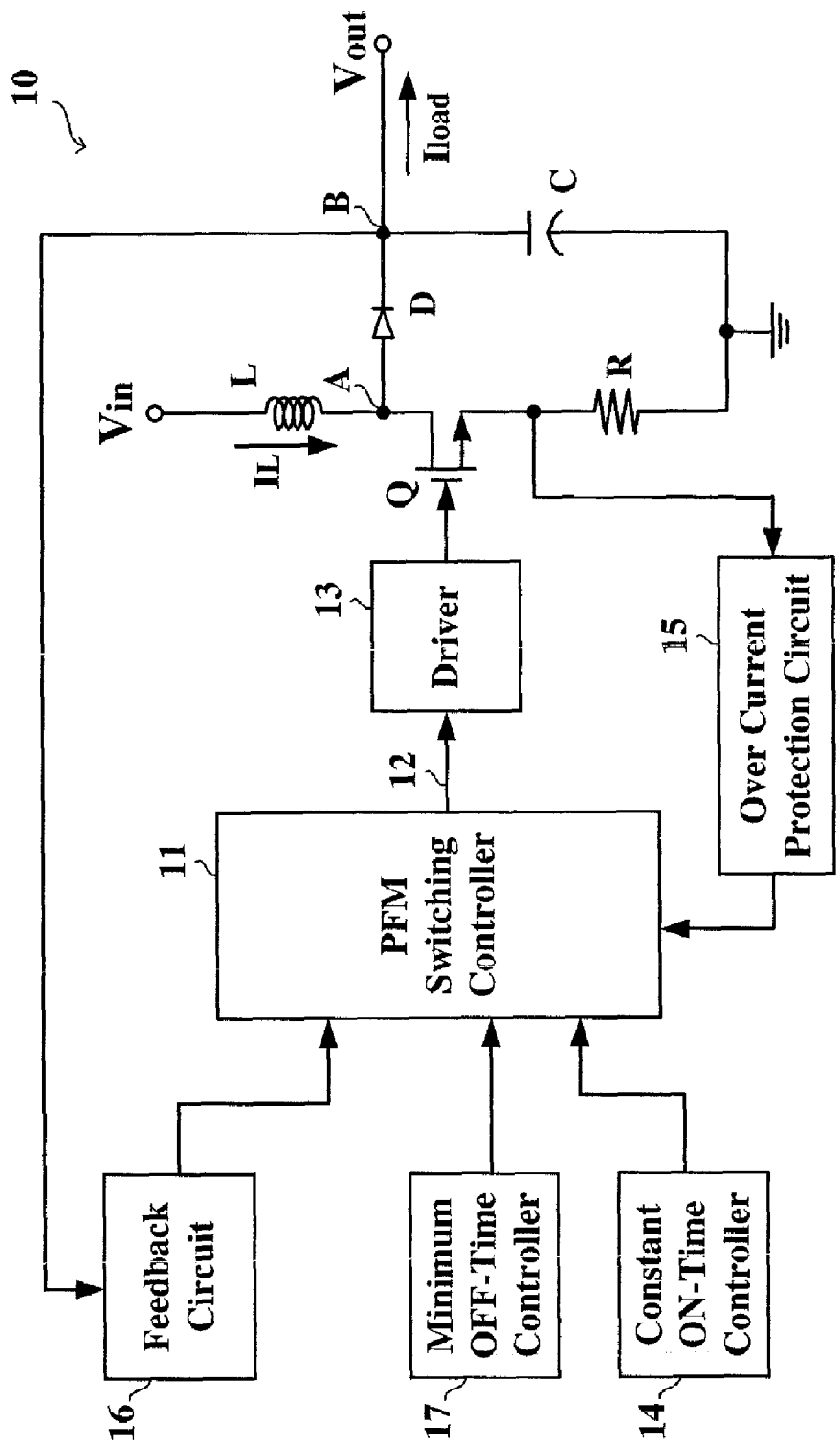
FIG. 1(a) is a circuit block diagram showing a conventional PFM voltage regulator.
Figure 1B:
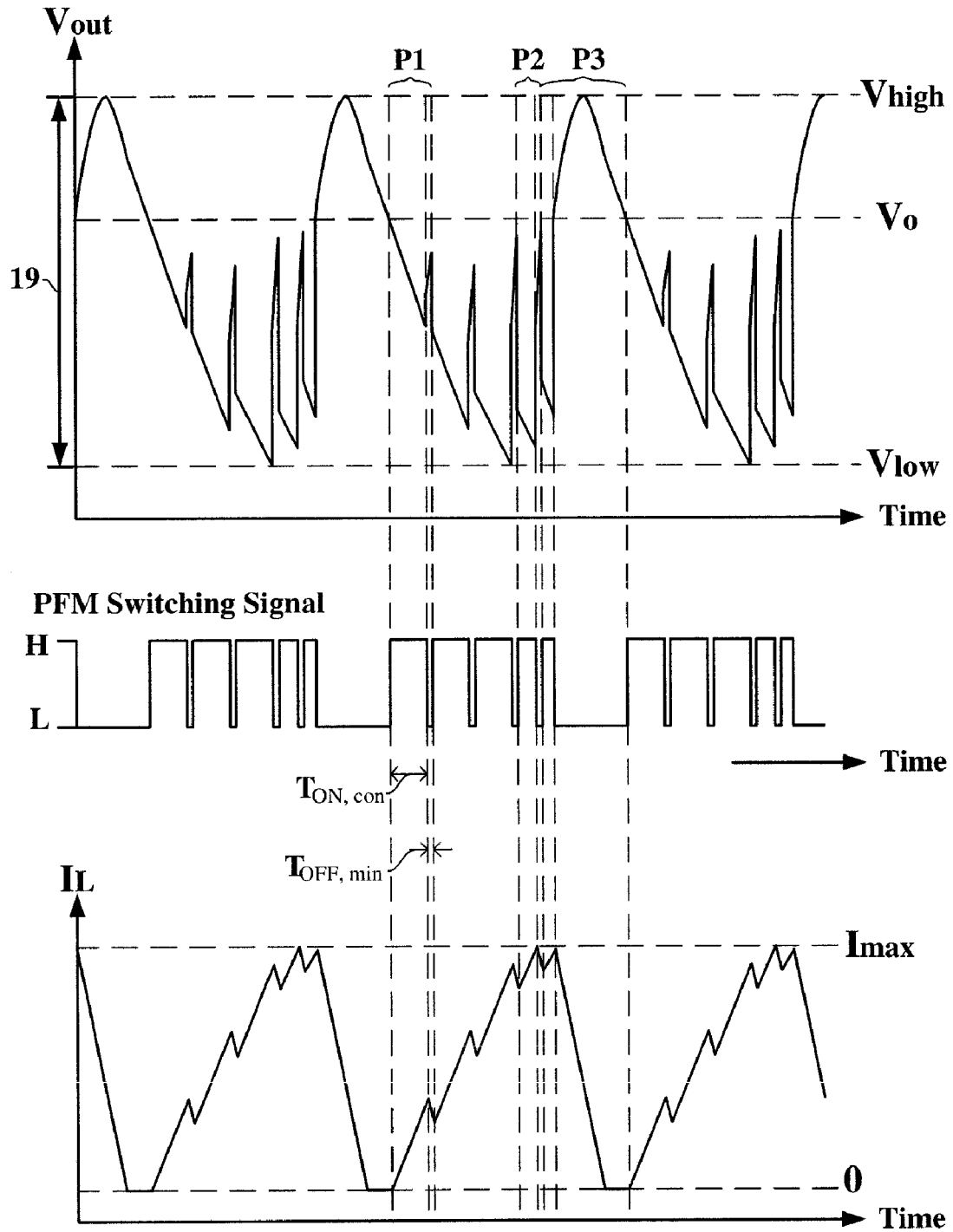
FIG. 1(b) is a waveform timing chart showing an operation of the conventional heavy loading PFM voltage regulator shown in FIG. 1(a)

For clearer appreciation of features of the present invention, described first is how U.S. Pat. No. 5,801,518 adversely causes an even greater output ripple. Because the output voltage $V_{out}$ in the heavy loading condition makes a change with a relatively larger degree of decrease during the OFF state of the power switch transistor Q (referred to as an OFF-time hereinafter), the prior art suggests that a shorter OFF-time be used to prevent the output voltage $V_{out}$ from decreasing too much and a longer conductive time of the power switch transistor Q (referred to as an ON-time hereinafter) be used to store more energy in the inductor L for supplementing the capacitor C later. However, as shown in FIG. 1(b), once the output voltage $V_{out}$ is lower than the target voltage $V_o$, the longer ON-time adversely causes the output voltage $V_{out}$ to decrease more deeply and results in a larger inductor current $I_L$. Moreover, the shorter OFF-time much more prevents the energy stored in the inductor L from sufficiently delivering to the capacitor C, which is just contrary to the assumptive supplementation effect expected by the prior art.

Figure 2A:
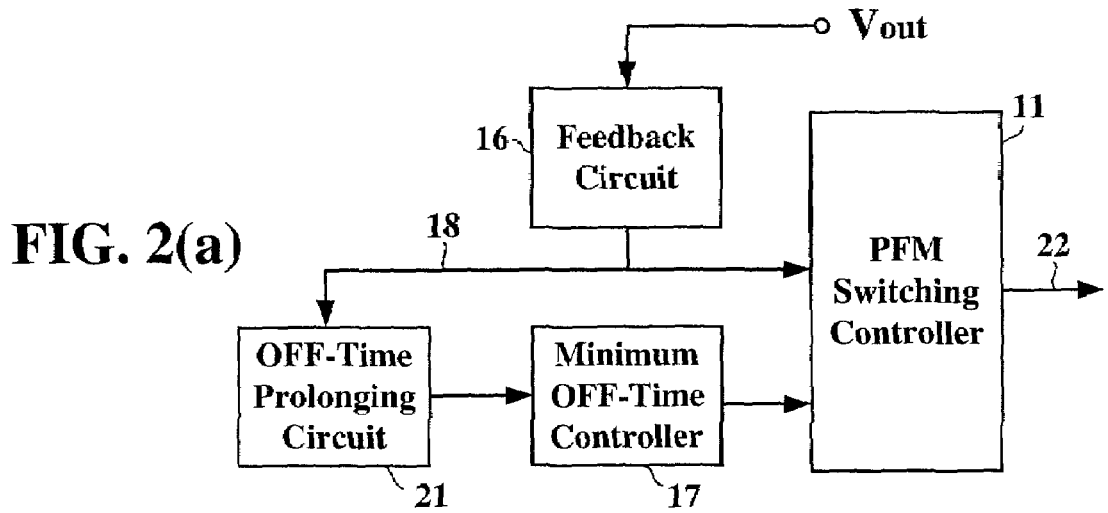
FIG. 2(a) to 2(c) are schematic diagrams showing a PFM voltage regulator capable of prolonging a minimum OFF-time according to the present invention.
Figure 2B:
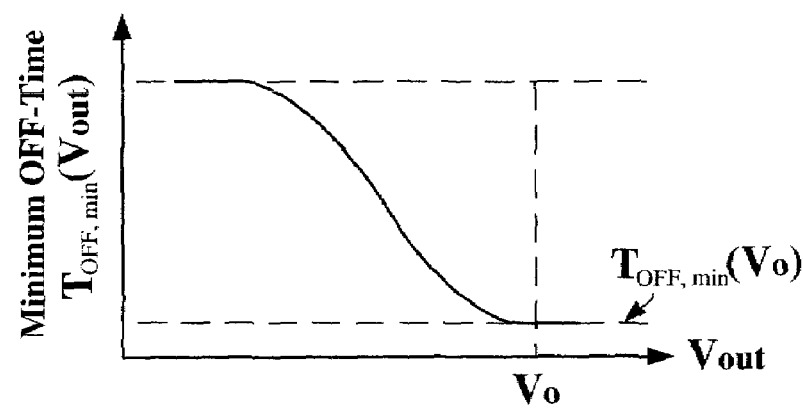
Figure 2C:
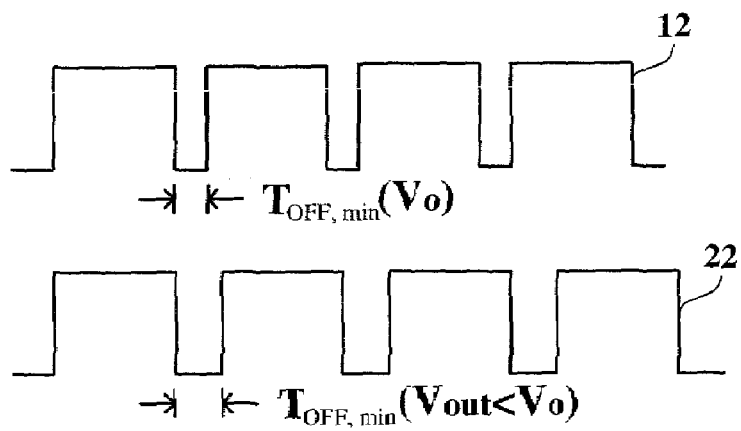

FIG. 2(a) to 2(c) are schematic diagrams showing a PFM voltage regulator capable of prolonging a minimum OFF-time according to the present invention. Referring to FIG. 2(a), the PFM voltage regulator according to the present invention is different from the PFM voltage regulator 10 shown in FIG. 1(a) in that the PFM voltage regulator is additionally provided with an OFF-time prolonging circuit 21 for achieving the object of reducing the output ripple. For easier appreciation of the inventive features, the PFM voltage regulator according to the present invention is only partially shown in FIG. 2(a) with an undepicted portion, which should refer to the PFM voltage regulator 10 shown in FIG. 1(a). More specifically, the feedback circuit 16 after monitoring the output voltage $V_{out}$ outputs a feedback signal 18 not only to the PFM switching controller 11 but also to the OFF-time prolonging circuit 21. When the output voltage $V_{out}$ is lower than the target voltage $V_o$, the OFF-time prolonging circuit 21 prolongs the minimum OFF-time $T_{OFF, min}$ determined by the minimum OFF-time controller 17, thereby causing the PFM switching controller 11 to generate a PFM switching signal 22 with a prolonged minimum OFF-time.

More specifically, the OFF-time prolonging circuit 21 is cooperated with the minimum OFF-time controller 17 for determining the extendable minimum OFF-time $T_{OFF, min}$ of the PFM switching signal 22 based on the output voltage $V_{out}$. For example, as shown in FIG. 2(b), the extendable minimum OFF-time $T_{OFF, min}$ of the PFM switching signal 22 may be a locally continuously decreasing function of the output voltage $V_{out}$, which is mathematically expressed as $T_{OFF, min}(V_{out})$. When the output voltage $V_{out}$ is higher than or equal to the target voltage $V_o$, the extendable minimum OFF-time $T_{OFF, min}$ has a minimum $T_{OFF, min}(V_o)$. When the output voltage $V_{out}$ is lower than the target voltage $V_o$, the extendable minimum OFF-time $T_{OFF, min}$ increases along with an increase of an absolute difference between the output voltage $V_{out}$ and the target voltage $V_o$. It should be noted that the present invention may be also applicable to a case where the extendable minimum OFF-time $T_{OFF, min}$ is a stepwise decreasing function of the output voltage $V_{out}$ or other types of functions as long as the functional relationship between the extendable minimum OFF-time $T_{OFF, min}$ and the output voltage $V_{out}$ satisfies the following inequality (1):

$$T_{OFF, min}(V_{out}<V_o)>T_{OFF, min}(V_{out}=V_o)=T_{OFF, min}(V_{out}>V_o) \quad (1)$$

Referring to FIG. 2(c), when the output voltage $V_{out}$ is lower than the target voltage $V_o$, the OFF-time of the conventional PFM switching signal 12 remains at the minimum OFF-time $T_{OFF, min}(V_o)$ regardless of the output voltage $V_{out}$. As compared, in the first embodiment according to the present invention, when the output voltage $V_{out}$ is lower than the target voltage $V_o$, the OFF-time of the PFM switching signal 22 is a prolonged minimum OFF-time $T_{OFF, min}(V_{out}<V_o)$ determined in accordance with the output voltage $V_{out}$.

In the PFM voltage regulator according to the present invention, because the minimum OFF-time $T_{OFF, min}$ of the PFM switching signal 22 is prolonged, the energy stored in the inductor L obtains a more sufficient period for delivering to the capacitor C, thereby preventing the inductor current $I_L$ from continuous accumulation. In addition, the output voltage $V_{out}$ has a relatively gentler degree of decrease since the energy stored in the inductor L delivers to the capacitor C for the more sufficient period. As a result, the ripple of the output voltage $V_{out}$ is effectively reduced.

Figure 3A:
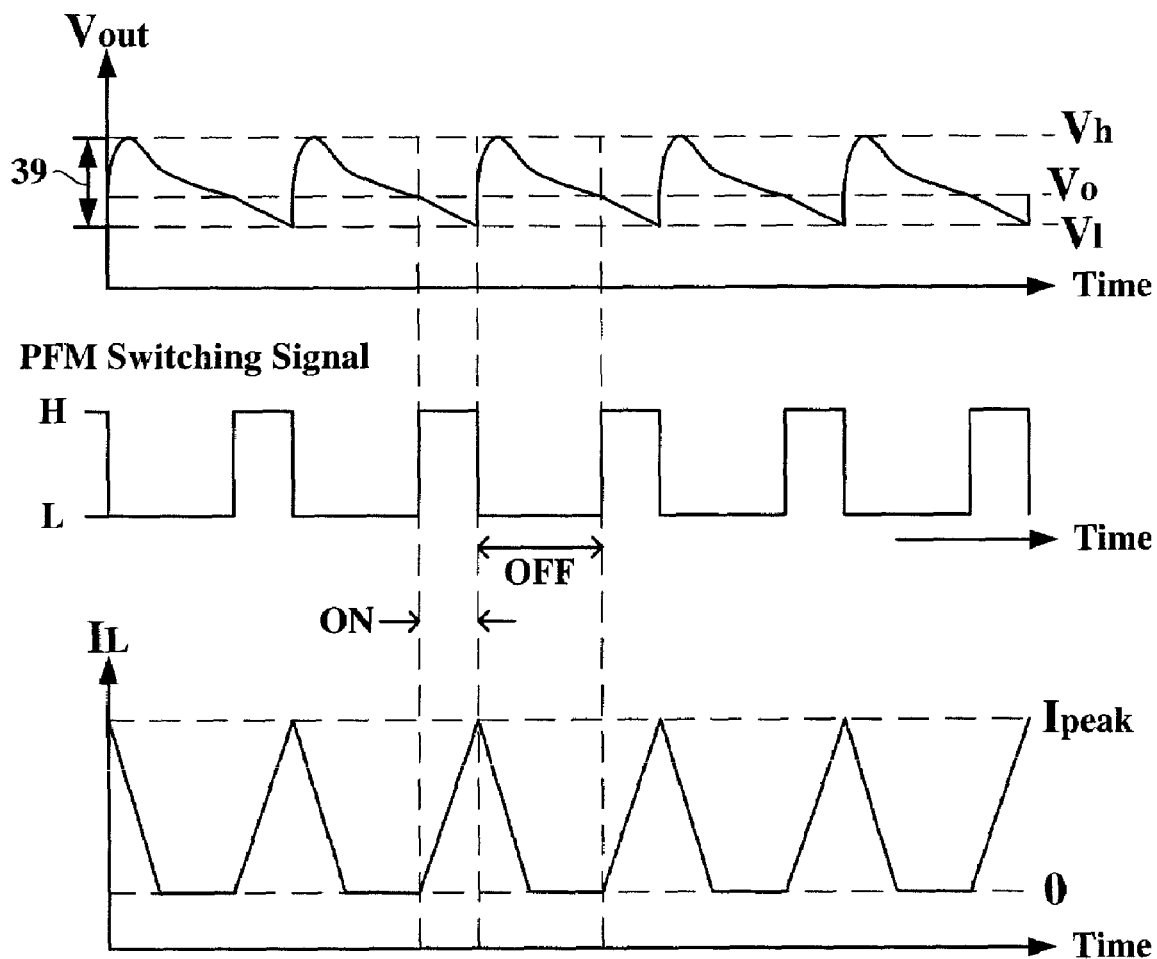
FIG. 3(a) and 3(b) are timing charts showing an operation of the heavy loading PFM voltage regulator according to the present invention.
Figure 3B:
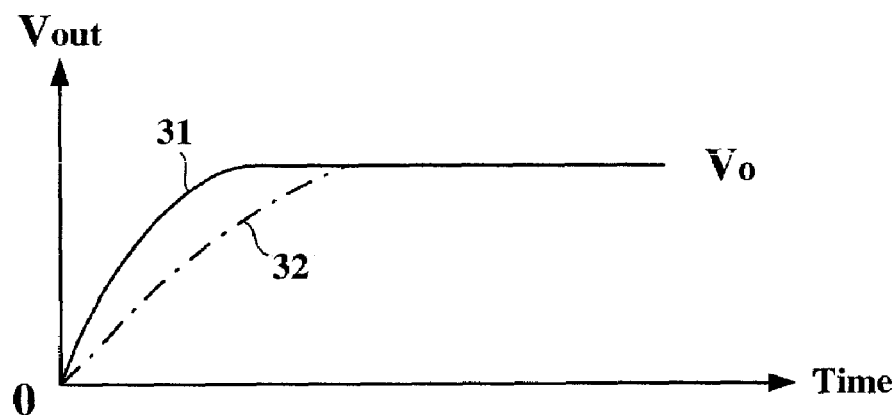

FIG. 3(a) and 3(b) are timing charts showing an operation of the heavy loading PFM voltage regulator according to the present invention. Referring to FIG. 3(a), when the output voltage $V_{out}$ is lower than the target voltage $V_o$ switching the transistor only one time is sufficient for the PFM voltage regulator according to the present invention to raise the output voltage $V_{out}$ over the target voltage $V_o$. Therefore, the output voltage $V_{out}$ is prevented from decreasing with a great degree. In addition, the peak value $I_{peak}$ of the inductor current $I_L$ is far lower than the upper limit of current $I_{max}$ since the inductor current $I_L$ is prevented from continuous accumulation. Therefore, the output voltage $V_{out}$ does not exhibit a great protrusive waveform once the energy stored in the inductor L is delivered to the capacitor C during the OFF-time. From the comparison between FIG. 3(a) and FIG. 1(b), the PFM voltage regulator according to the present invention effectively reduces a ripple 39 of the output voltage $V_{out}$ in the heavy loading condition.

In addition to the advantage of reducing the output ripple, the PFM voltage regulator according to the present invention further provides another advantage of shortening a transient period spent by the PFM voltage regulator from start-up to a stable operational state where the output voltage $V_{out}$ reaches the target voltage $V_o$. Referring to FIG. 3(b), a solid line 31 is representative of a change of the output voltage $V_{out}$ along with time for the PFM voltage regulator according to the present invention from start-up to a stable operational state while the dotted line 32 is representative of a change of the output voltage $V_{out}$ along with time for the conventional PFM voltage regulator from start-up to a stable operational state. Because the PFM voltage regulator according to the present invention prolongs the minimum OFF-time and/or shortens the constant ON-time when the output voltage $V_{out}$ is lower than the target voltage $V_o$, the energy stored in the inductor L is more efficiently delivered to the capacitor C, the inductor current $I_L$ is prevented from continuous accumulation, and the degree of decrease for the output voltage $V_{out}$ becomes relatively gentler. As a result, the output voltage $V_{out}$ of the PFM voltage regulator according to the present invention reaches the target voltage $V_o$ in a shorter period of time.

It should be noted that although the embodiments described above are applied to the step-up (or boost) PFM voltage regulator, the present invention is not limited to this and may be applied to a step-down (or buck) PFM voltage regulator for reducing the output ripple and shortening the transient period spent from start-up to a stable operational state. Moreover, although the embodiments described above are applied to the discontinuous mode PFM voltage regulator, the present invention is not limited to this and may be applied to a continuous mode PFM voltage regulator.

Figure 4:
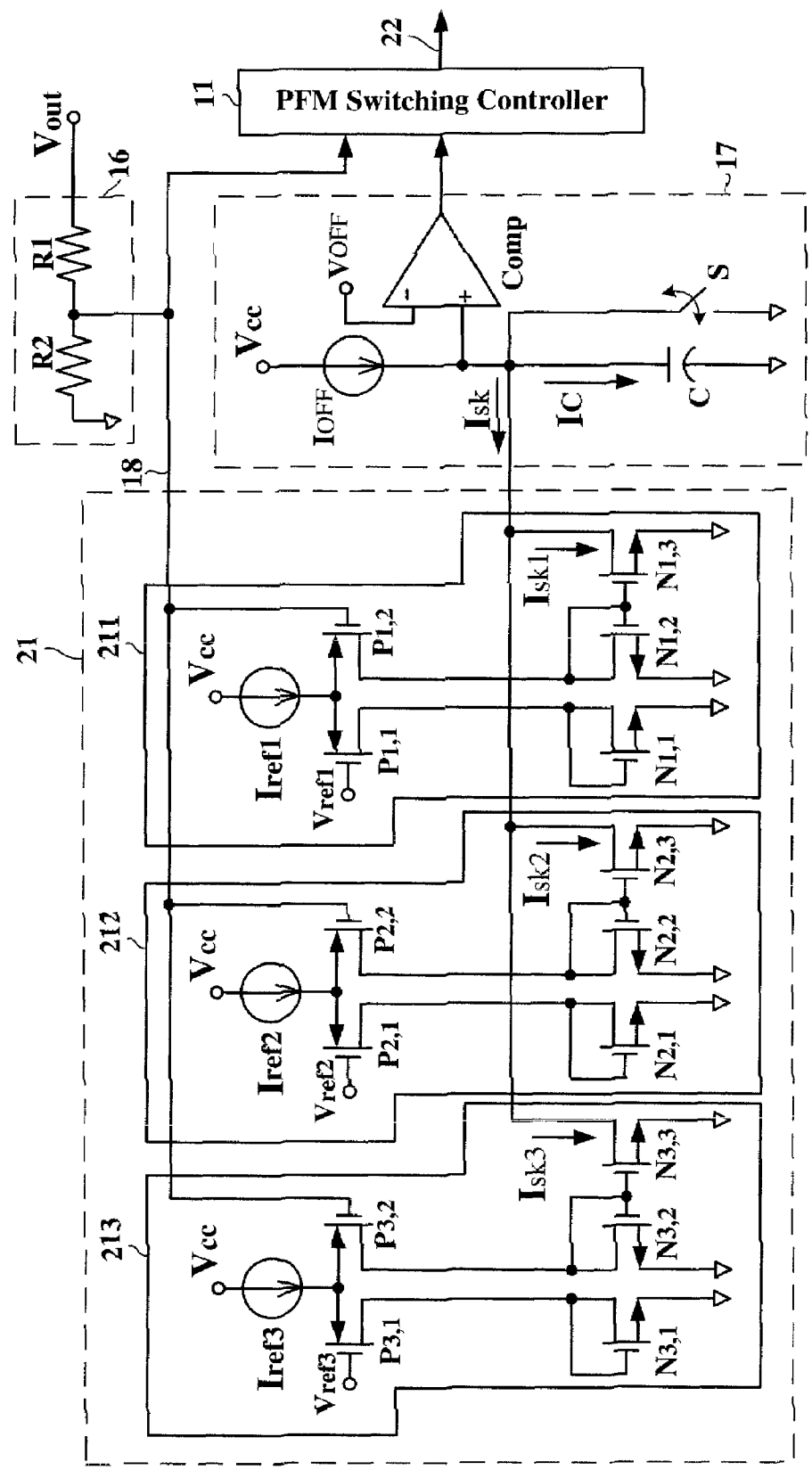
FIG. 4 is a detailed circuit diagram showing part of a PFM voltage regulator capable of prolonging a minimum OFF-time according to the present invention.

FIG. 4 is a detailed circuit diagram showing part of a PFM voltage regulator capable of prolonging a minimum OFF-time according to the present invention. Referring to FIG. 4, the minimum OFF-time controller 17 sets the minimum OFF-time $T_{OFF, min}$ by using a charging period $\Delta T_C$ necessary for raising a potential difference across a capacitor $C_{OFF}$ from zero to a predetermined reference voltage. More specifically, the minimum OFF-time controller 17 includes a voltage comparator Comp whose inverting terminal (designated with a symbol "−") is coupled to an OFF-time reference voltage $V_{OFF}$. The capacitor $C_{OFF}$ is coupled between a non-inverting terminal (designated with a symbol "+") of the voltage comparator Comp and ground, and is charged by a minimum OFF-time setting current source $I_{OFF}$. A switching means S is coupled between the charging path of the capacitor $C_{OFF}$ and ground.

Hereinafter is described an operation of the minimum OFF-time controller 17. Initially, the switching means S is at a short-circuit state such that the potential difference across the capacitor $C_{OFF}$ is zero. The output terminal of the voltage comparator Comp is at a low levelstate because the potential at the non-inverting terminal is lower than the potential $V_{OFF}$ at the inverting terminal. Once the switching means S is changed to an open-circuit state from the short-circuit state, the capacitor $C_{OFF}$ starts being charged by a charging current $I_{C, OFF}$, resulting in an increase of the potential at the non-inverting terminal of the voltage comparator Comp. When the potential at the non-inverting terminal of the voltage comparator Comp increases to become larger than the OFF-time reference voltage $V_{OFF}$, the output terminal of the voltage comparator Comp is inverted to a high level state. The charging period $\Delta T_C$ necessary for raising the potential difference across the capacitor $C_{OFF}$ from zero to the OFF-time reference voltage $V_{OFF}$ may be expressed in the following equation (2):

$$\Delta T_C = C_{OFF} \cdot (V_{OFF}/I_{C, OFF}) \qquad (2)$$

The minimum OFF-time controller 17 employs the charging period $\Delta T_C$ as the minimum OFF-time $T_{OFF, min}$.

In the present invention, the OFF-time prolonging circuit 21 achieves an object of prolonging the charging period $\Delta T_C$, i.e. the minimum OFF-time $T_{OFF, min}$, by reducing the charging current $I_{C, OFF}$. More specifically, the OFF-time prolonging circuit 21 includes three current sinking devices 211 to 213 for separately providing three sinking currents $I_{sk1}$ to $I_{sk3}$ so as to sink current from the minimum OFF-time setting current source $I_{OFF}$. The current sinking device 211 has two identical PMOS transistors $P_{1,1}$ and $P_{1,2}$ and two identical NMOS transistors $N_{1,1}$ and $N_{1,2}$, together for forming a differential current pair. The PMOS transistors $P_{1,1}$ and $P_{1,2}$ have their source electrodes coupled together, to which a current source $I_{ref1}$ is supplied. The NMOS transistor $N_{1,1}$ has its gate and drain electrodes coupled together, and further coupled to a drain electrode of the PMOS transistor $P_{1,1}$. The NMOS transistor $N_{1,2}$ has its gate and drain electrodes coupled together, and further coupled to a drain electrode of the PMOS transistor $P_{1,2}$. A reference voltage $V_{ref1}$ is used for controlling a gate electrode of the PMOS transistor $P_{1,1}$ while the feedback signal 18 from the feedback circuit 16 is used for controlling a gate electrode of the PMOS transistor $P_{1,2}$. The higher the feedback voltage 18 is than the reference voltage $V_{ref1}$ the closer the drain current of the PMOS transistor $P_{1,2}$ is to zero. The lower the feedback voltage 18 is than the reference voltage $V_{ref1}$ the closer the drain current of the PMOS transistor $P_{1,2}$ is to the current source I. Since an NMOS transistor $N_{1,3}$ is provided to form a pair of current mirrors together with the NMOS transistor $N_{1,2}$, the drain current of the NMOS transistor $N_{1,3}$ is equal to the drain current of the NMOS transistor $N_{1,2}$, i.e. the drain current of the PMOS transistor $P_{1,2}$. The NMOS transistor $N_{1,3}$ has its drain electrode coupled to the charging path of the capacitor $C_{OFF}$ such that the drain current of the NMOS transistor $N_{1,3}$ is served as the sinking current $I_{sk1}$.

The current sinking device 212 has two identical PMOS transistors $P_{2,1}$ and $P_{2,2}$ and two identical NMOS transistors $N_{2,1}$ and $N_{2,2}$, together for forming a differential current pair. The PMOS transistors $P_{2,1}$ and $P_{2,2}$ have their source electrodes coupled together, to which a current source $I_{ref2}$ is supplied. The NMOS transistor $N_{2,1}$ has its gate and drain electrodes coupled together, and further coupled to a drain electrode of the PMOS transistor $P_{2,1}$. The NMOS transistor $N_{2,2}$ has its gate and drain electrodes coupled together, and further coupled to a drain electrode of the PMOS transistor $P_{2,2}$. A reference voltage $V_{ref2}$ is used for controlling a gate electrode of the PMOS transistor $P_{2,1}$ while the feedback signal 18 from the feedback circuit 16 is used for controlling a gate electrode of the PMOS transistor $P_{2,2}$. The higher the feedback voltage 18 is than the reference voltage $V_{ref2}$, the closer the drain current of the PMOS transistor $P_{2,2}$ is to zero. The lower the feedback voltage 18 is than the reference voltage $V_{ref2}$, the closer the drain current of the PMOS transistor $P_{2,2}$ is to the current source $I_{ref2}$. Since an NMOS transistor $N_{2,3}$ is provided to form a pair of current mirrors together with the NMOS transistor $N_{2,2}$, the drain current of the NMOS transistor $N_{2,3}$ is equal to the drain current of the NMOS transistor $N_{2,2}$, i.e. the drain current of the PMOS transistor $P_{2,2}$. The NMOS transistor $N_{2,3}$ has its drain electrode coupled to the charging path of the capacitor $C_{OFF}$ such that the drain current of the NMOS transistor $N_{2,3}$ is served as the sinking current $I_{sk2}$.

The current sinking device 213 has two identical PMOS transistors $P_{3,1}$ and $P_{3,2}$ and two identical NMOS transistors $N_{3,1}$ and $N_{3,2}$, together for forming a differential current pair. The PMOS transistors $P_{3,1}$ and $P_{3,2}$ have their source electrodes coupled together, to which a current source $I_{ref3}$ is supplied. The NMOS transistor $N_{3,1}$ has its gate and drain electrodes coupled together, and further coupled to a drain electrode of the PMOS transistor $P_{3,1}$. The NMOS transistor $N_{3,2}$ has its gate and drain electrodes coupled together, and further coupled to a drain electrode of the PMOS transistor $P_{3,2}$. A reference voltage $V_{ref3}$ is used for controlling a gate electrode of the PMOS transistor $P_{3,1}$ while the feedback signal 18 from the feedback circuit 16 is used for controlling a gate electrode of the PMOS transistor $P_{3,2}$. The higher the feedback voltage 18 is than the reference voltage $V_{ref3}$ the closer the drain current of the PMOS transistor $P_{3,2}$ is to zero. The lower the feedback voltage 18 is than the reference voltage $V_{ref3}$, the closer the drain current of the PMOS transistor $P_{3,2}$ is to the current source $I_{ref3}$. Since an NMOS transistor $N_{3,3}$ is provided to form a pair of current mirrors together with the NMOS transistor $N_{3,2}$, the drain current of the NMOS transistor $N_{3,3}$ is equal to the drain current of the NMOS transistor $N_{3,2}$, i.e. the drain current of the PMOS transistor $P_{3,2}$. The NMOS transistor $N_{3,3}$ has its drain electrode coupled to the charging path of the capacitor $C_{OFF}$ such that the drain current of the NMOS transistor $N_{3,3}$ is served as the sinking current $I_{sk3}$.

Consequently, the OFF-time prolonging circuit 21 provides a total sinking current $I_{sk}$, which is a sum of the three sinking currents $I_{sk1}$ to $I_{sk3}$. In this embodiment, the reference voltage $V_{ref1}$ is set higher than the reference voltage $V_{ref2}$ and the reference voltage $V_{ref2}$ is set higher than the reference voltage $V_{ref3}$. Therefore, when the feedback signal 18 is sufficiently lower than the reference voltage $V_{ref3}$, the total sinking current Isk reaches a maximum, which is a sum of the three current sources $I_{ref1}$ to $I_{ref3}$. When the feedback signal 18 is sufficiently higher than the reference voltage $V_{ref1}$, the total sinking current Isk reaches a minimum, which is zero. Since the feedback signal 18 is indicative of the output voltage $V_{out}$, for example, the feedback signal 18 is a division of the output voltage $V_{out}$: $V_{out} \cdot [R2/(R1+R2)]$, the total sinking current Isk is a locally continuously decreasing function of the output voltage $V_{out}$. In order for the OFF-time prolonging circuit 21 to start sinking current from the minimum OFF-time setting current source $I_{OFF}$ once the output voltage $V_{out}$ is lower than the target voltage $V_o$, the reference voltage $V_{ref1}$ may be set slightly lower than a voltage of $V_o \cdot [R2/(R1+R2)]$, which is determined by dividing the target voltage $V_o$ through using the feedback circuit 16.

As clearly seen from FIG. 3, because the OFF-time prolonging circuit 21 provides a total sinking current $I_{sk}$, the charging current $I_{C, OFF}$ of the capacitor $C_{OFF}$ is expressed in the following equation (3):

$$I_{C,OFF} = I_{OFF} - I_{sk} \quad (3)$$

Substituting the equation (3) for equation (2), the charging period $\Delta T_C$ necessary for raising the potential difference across the capacitor $C_{OFF}$ from zero to the OFF-time reference voltage $V_{OFF}$ may be expressed in the following equation (4):

$$\Delta T_C = C_{OFF} \cdot [V_{OFF}/(I_{OFF} - I_{sk})] \quad (4)$$

As described above, the minimum OFF-time controller 17 employs the charging period $\Delta T_C$ as the minimum OFF-time $T_{OFF, min}$ and the total sinking current $I_{sk}$ is the locally continuously decreasing function of the output voltage $V_{out}$, the minimum OFF-time $T_{OFF, min}$ becomes a locally continuously decreasing function of the output voltage $V_{out}$, as shown in FIG. 2(b).

It should be noted that although in the embodiment the OFF-time prolonging circuit 21 is provided with the three current sinking devices 211 to 213, the present invention is not limited to this and may be applied to a case where the OFF-time prolonging circuit 21 has at least one of the three current sinking devices 211 to 213.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A pulse frequency modulated (PFM) voltage regulator for converting a DC voltage source to an output voltage, comprising:
   a PFM switching controller for generating a PFM switching signal for converting the DC voltage source to the output voltage;
   a feedback circuit for generating a feedback signal in response to the output voltage;
   a minimum OFF-time controller for providing the PFM switching signal with a predetermined minimum OFF-time; and
   an OFF-time prolonging circuit for prolonging the predetermined minimum OFF-time in response to the feedback signal when the output voltage is lower than a predetermined target voltage, whereby:
   reducing a ripple of the output voltage.

2. The PFM voltage regulator according to claim 1, wherein:
   the predetermined minimum OFF-time of the PFM switching signal is prolonged in accordance with an absolute difference between the output voltage and the predetermined target voltage.

3. The PFM voltage regulator according to claim 2, wherein:
   the predetermined minimum OFF-time of the PFM switching signal is prolonged along with an increase of the absolute difference between the output voltage and the predetermined target voltage.

4. The PFM voltage regulator according to claim 1, wherein:
   the predetermined target voltage is a DC component of the output voltage.

5. The PFM voltage regulator according to claim 1, wherein:
   the PFM voltage regulator is operated in a heavy loading condition.

6. The PFM voltage regulator according to claim 1, further comprising:
   a power switch transistor controlled by the PFM switching signal such that the power switch transistor is turned on during an ON-time of the PFM switching signal and is turned off during an OFF-time of the PFM switching signal, in which the ON-time is shorter than or equal to a predetermined constant ON-time and the OFF-time is longer than or equal to the predetermined minimum OFF-time.

7. The PFM voltage regulator according to claim 1, wherein:
the minimum OFF-time controller includes:
a capacitor, and
a minimum OFF-time setting current source for charging the capacitor such that the predetermined minimum OFF-time is determined by a charging period necessary for raising a potential difference across the capacitor from zero to a predetermined reference voltage, and the OFF-time prolonging circuit prevents at least one part of the minimum OFF-time setting current source from charging the capacitor in response to the feedback signal when the output voltage is lower than the predetermined target voltage, thereby prolonging the predetermined minimum OFF-time.

8. The PFM voltage regulator according to claim 7, wherein:
the OFF-time prolonging circuit includes:
a prolonging reference voltage set lower than a target feedback signal, the target feedback signal being generated by the feedback circuit in response to the predetermined target voltage, and
a differential current pair for determining a sinking current in accordance with an absolute difference between the feedback signal and the prolonging reference voltage such that the sinking current is used for prolonging the predetermined minimum OFF-time when the feedback signal is lower than the prolonging reference voltage.

9. The PFM voltage regulator according to claim 8, wherein:
the lower the feedback signal is than the prolonging reference voltage, the larger the sinking current is.

10. A pulse frequency modulated (PFM) voltage regulator, comprising:
an inductive means coupled to a DC voltage source;
a capacitive means having a terminal coupled to the inductive means and providing an output voltage;
a PFM switching controller for generating a PFM switching signal for converting the DC voltage source to the output voltage;
a feedback circuit for generating a feedback signal in response to the output voltage;
a minimum time controller coupled to the PFM switching controller, for controlling a minimum time of each period of the PFM switching signal spent on delivering energy from the inductive means to the capacitive means; and
an time prolonging circuit for prolonging the minimum time spent on delivering energy from the inductive means to the capacitive means in response to the feedback signal when the output voltage is lower than a predetermined target voltage.

11. The PFM voltage regulator according to claim 10, wherein:
a ripple of the output voltage is reduced by using the time prolonging circuit.

12. The PFM voltage regulator according to claim 10, wherein:
the minimum time spent on delivering energy from the inductive means to the capacitive means is prolonged in accordance with an absolute difference between the output voltage and the predetermined target voltage.

13. The PFM voltage regulator according to claim 12, wherein:
the minimum time spent on delivering energy from the inductive means to the capacitive means is prolonged along with an increase of the absolute difference between the output voltage and the predetermined target voltage.

14. The PFM voltage regulator according to claim 10, wherein:
the PFM voltage regulator is operated in a heavy loading condition, and
the predetermined target voltage is a DC component of the output voltage.

15. The PFM voltage regulator according to claim 10, wherein:
the minimum time controller includes:
a setting capacitor; and
a setting current source for charging the setting capacitor such that the minimum time spent on delivering energy from the inductive means to the capacitive means is determined by a charging period necessary for raising a potential difference across the capacitor from zero to a predetermined reference voltage, and
the time prolonging circuit prevents at least one part of the setting current source from charging the capacitor in response to the feedback signal when the output voltage is lower than the predetermined target voltage, thereby prolonging the minimum time spent on delivering energy from the inductive means to the capacitive means.

16. The PFM voltage regulator according to claim 15, wherein:
the time prolonging circuit includes:
a prolonging reference voltage set lower than a target feedback signal, the target feedback signal being generated by the feedback circuit in response to the predetermined target voltage, and
a differential current pair for determining a sinking current in accordance with an absolute difference between the feedback signal and the prolonging reference voltage such that the sinking current is used for prolonging the minimum time spent on delivering energy from the inductive means to the capacitive means when the feedback signal is lower than the prolonging reference voltage.

17. An OFF-time prolonging circuit for a pulse frequency modulated (PFM) voltage regulator, the PFM voltage regulator converting a DC voltage source to an output voltage by using a PFM switching signal having a predetermined minimum OFF-time, the output voltage having a DC component equal to a predetermined target voltage, the OFF-time prolonging circuit comprising:
a feedback signal indicative of the output voltage, in which the feedback signal is referred to as a target feedback signal when the output voltage is equal to the predetermined target voltage;
a first reference voltage set lower than the target feedback signal; and
a first differential current pair for determining a first sinking current in accordance with an absolute difference between the feedback signal and the first reference voltage such that the first sinking current is used for prolonging the predetermined minimum OFF-time when the feedback signal is lower than the first reference voltage.

18. The OFF-time prolonging circuit according to claim 17, wherein:
the lower the feedback signal is than the first reference voltage, the larger the first sinking current is.

19. The OFF-time prolonging circuit according to claim 17, further comprising:
 a second reference voltage set lower than the first reference voltage, and
 a second differential current pair for determining a second sinking current in accordance with an absolute difference between the feedback signal and the second reference voltage such that the first and second sinking currents are used for prolonging the predetermined minimum OFF-time when the feedback signal is lower than the second reference voltage.

20. The OFF-time prolonging circuit according to claim 17, wherein:
 the predetermined minimum OFF-time is set as a period necessary for raising a potential difference across a capacitor from zero to a predetermined voltage by using a charging current, and
 the first sinking current is used for reducing the charging current.

\* \* \* \* \*